(12) United States Patent
Marko

(10) Patent No.: US 8,973,031 B2
(45) Date of Patent: *Mar. 3, 2015

(54) SYSTEM FOR INSERTION OF LOCALLY CACHED INFORMATION INTO A RECEIVED BROADCAST STREAM

(71) Applicant: Sirius XM Radio Inc., New York, NY (US)

(72) Inventor: Paul D. Marko, Pembroke Pines, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/032,400

(22) Filed: Sep. 20, 2013

(65) Prior Publication Data

US 2014/0089965 A1 Mar. 27, 2014

Related U.S. Application Data

(63) Continuation of application No. 12/000,198, filed on Dec. 10, 2007, now Pat. No. 8,544,038.

(60) Provisional application No. 60/873,599, filed on Dec. 8, 2006.

(51) Int. Cl.
| | |
|---|---|
| *H04N 7/10* | (2006.01) |
| *H04N 7/025* | (2006.01) |
| *H04N 21/44* | (2011.01) |
| *G11B 27/034* | (2006.01) |
| *G11B 27/10* | (2006.01) |
| *G11B 27/30* | (2006.01) |
| *H04H 20/10* | (2008.01) |
| *H04H 20/40* | (2008.01) |
| *H04N 21/81* | (2011.01) |

(52) U.S. Cl.
CPC ........ *H04N 21/44004* (2013.01); *G11B 27/034* (2013.01); *G11B 27/105* (2013.01); *G11B 27/3027* (2013.01); *H04H 20/106* (2013.01); *H04H 20/40* (2013.01); *H04N 21/8126* (2013.01)
USPC .......................................................... 725/32

(58) Field of Classification Search
None
See application file for complete search history.

(56) References Cited

U.S. PATENT DOCUMENTS

| | | | |
|---|---|---|---|
| 5,027,400 | A | 6/1991 | Baji et al. |
| 5,586,264 | A | 12/1996 | Belknap et al. |
| 6,487,721 | B1 | 11/2002 | Safadi |
| 6,564,003 | B2 | 5/2003 | Marko et al. |
| 7,171,174 | B2 | 1/2007 | Ellis et al. |
| 7,180,917 | B1 | 2/2007 | Marko et al. |

(Continued)

*Primary Examiner* — Brian T Pendleton
*Assistant Examiner* — Ryan Stronczer
(74) *Attorney, Agent, or Firm* — Roylance, Abrams, Berdo & Goodman, LLP

(57) ABSTRACT

A method and apparatus are provided for receiving a broadcast comprising a plurality of program channels and generating a playback stream using at least one of a buffered program channel and stored indexed content (e.g., commercials, programs, songs) for insertion. Control data controls which receivers insert which indexed content and when the indexed content is inserted into a received program channel, allowing for playback of songs from playlists, tiered subscription services, and sponsorship of broadcast program channels to provide market-directed content to selected receivers and listeners. Buffer management operations prevent uncontrolled buffer growth and commercial content avoidance through rapid channel changes.

24 Claims, 9 Drawing Sheets

(56) References Cited

U.S. PATENT DOCUMENTS

| | | |
|---|---|---|
| 7,263,329 B2 | 8/2007 | Acker |
| 7,343,141 B2 | 3/2008 | Ellis et al. |
| 7,409,140 B2 | 8/2008 | Rodriguez et al. |
| 7,454,166 B2 | 11/2008 | Patsiokas et al. |
| 7,526,784 B2 * | 4/2009 | Jarman .......................... 725/28 |
| 7,720,432 B1 | 5/2010 | Colby et al. |
| 2002/0032019 A1 | 3/2002 | Marks et al. |
| 2002/0144262 A1 | 10/2002 | Plotnick et al. |
| 2003/0005464 A1 | 1/2003 | Gropper et al. |
| 2003/0093790 A1 | 5/2003 | Logan et al. |
| 2003/0172383 A1 * | 9/2003 | Takagi et al. ................. 725/89 |
| 2003/0226150 A1 * | 12/2003 | Berberet et al. ................ 725/94 |
| 2004/0116070 A1 | 6/2004 | Fishman et al. |
| 2004/0266336 A1 | 12/2004 | Patsiokas et al. |
| 2006/0031870 A1 * | 2/2006 | Jarman et al. .................. 725/25 |
| 2006/0080454 A1 | 4/2006 | Li |
| 2006/0085816 A1 | 4/2006 | Funk et al. |
| 2006/0130119 A1 | 6/2006 | Candelore et al. |
| 2006/0136967 A1 | 6/2006 | Hellman |
| 2006/0174313 A1 | 8/2006 | Ducheneaut et al. |
| 2006/0190970 A1 | 8/2006 | Hellman |
| 2007/0014536 A1 | 1/2007 | Hellman |
| 2007/0113243 A1 | 5/2007 | Brey |
| 2007/0140318 A1 | 6/2007 | Hellman |
| 2008/0066134 A1 | 3/2008 | Wiercienski et al. |

* cited by examiner

| nSID | SID1/T | ... | SIDn/T | nMFC | MFCW | MFC1/T | ... | MFCn/T | nS-CID | S-CID1/T | ... | S-CIDn/T |

FIG. 9

| nSID | SID1/T | ... | SIDn/T | SMFC | EMFC | nB-CID | B-CID1/T | ... | B-CIDn/T | nS-CID | S-CID1/T | ... | S-CIDn/T |

FIG. 10

SYSTEM FOR INSERTION OF LOCALLY CACHED INFORMATION INTO A RECEIVED BROADCAST STREAM

This application is a continuation of U.S. patent application Ser. No. 12/000,198, filed on Dec. 10, 2007, which claims the benefit of U.S. provisional application Ser. No. 60/873,599, filed Dec. 8, 2006; the entire contents of each application being incorporated herein by reference.

CROSS-REFERENCE TO RELATED APPLICATIONS

Related subject matter is disclosed and claimed in U.S. patent application Ser. No. 09/695,226, filed Oct. 25, 2000 (now issued as U.S. Pat. No. 7,180,917), and U.S. patent application Ser. No. 11/892,475, filed Aug. 23, 2007 (now issued as U.S. Pat. No. 7,822,381), the entire contents of which are incorporated herein by reference.

FIELD OF THE INVENTION

The present invention relates to a system and method for implementing tiered subscription services for subscribers to digital broadcasting services. More particularly, the present invention relates to a broadcast system configured to allow commercial or other content cached locally at receivers to be selectively added to a received broadcast stream based on a subscription level or tier, and for management of locally buffered received content as cached content is inserted into the stream output from the buffer and selected buffered broadcast segments are dropped or skipped from playback.

BACKGROUND OF THE INVENTION

A number of providers of broadcast content (e.g., Satellite Digital Audio Service (SDARS) provider XM Satellite Radio Inc.) offer subscription services such as a monthly fee for reception of broadcast content that is primarily commercial free. Some users, however, may find the monthly fee amount to be cost prohibitive, but would consider paying for a broadcast service having a higher percentage of commercial content but a lower subscription fee.

A need therefore exists for a broadcast system that can offer different subscription rates that are based on different levels of commercial content being provided to the subscribers with the broadcast content.

A tiered subscription broadcast system is described in U.S. Patent Application Publication No. U.S. 2006/0190970, to Hellman. In this system, a receiver plays back either received broadcast content in real-time or substituted commercial content. To achieve real-time playback of the received broadcast stream, a real-time broadcast segment is selected to be dropped and commercial content substituted therefor, along with the addition of interstitial content as needed to make up the difference in the durations of the substituted commercial content and the segment dropped from the received broadcast stream to accommodate the substitution of commercial content. This system has the drawback that the real-time broadcast segment which is dropped is typically a song of 3-4 minutes in length, requiring substitution of 3-4 minutes of back-to-back commercials. Since many listeners would be dissatisfied with such long continuous commercial breaks, a need exists to enable the insertion of shorter commercial breaks, which may be as little as 5 seconds in duration.

SUMMARY OF THE INVENTION

Exemplary embodiments of the present invention address at least the above problems and/or disadvantages and provide at least the advantages described below.

In accordance with an exemplary embodiment of the present invention, a method of inserting content into a received broadcast stream for playback is provided that comprises receiving a broadcast stream having at least one program channel for playback and processing the received broadcast stream for playback at a user's receiver in a playback stream. Changes between program channel content segments are determined in the program channel. Indexed content segments are received that can be inserted into the playback stream at selected content index pointers corresponding to potential insertion points between selected ones of the program channel content segments. Control data are received that indicate which of the indexed content segments to store at the receiver, as well as at least one of the frequency and when to insert selected ones of the indexed content segments into the playback stream. Selected ones of the received indexed content segments are stored at the receiver in accordance with the received control data. The method also comprises generating the playback stream using the program channel, determining which of the stored indexed content segments are to be inserted into the playback stream, buffering the program channel, pausing the buffered program channel at a selected one of the content index pointers during playback of the playback stream, and inserting a selected one of the stored indexed content segments into the playback stream in accordance with the control data, and resuming playback of the buffered program channel by determining at the receiver which of the buffered program content segments to playback when resuming the playback of the buffered program channel, the buffered program channel being time delayed relative to the received broadcast stream during playback due to the inserted indexed content segment.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIGS. 9 and 10 illustrate control messages in accordance with an exemplary embodiment of the present invention.

DETAILED DESCRIPTION OF THE EXEMPLARY EMBODIMENTS

As will be described below in accordance with an exemplary embodiment of the present invention, a receiver is configured to store a received broadcast stream into a buffer. In contrast with the system disclosed in the above-referenced Hellman application, the receiver only drops broadcast segments from the buffer (or skips a received broadcast segment in a buffer) after a corresponding amount of commercial content has been inserted into the playback stream.

Figure 1:
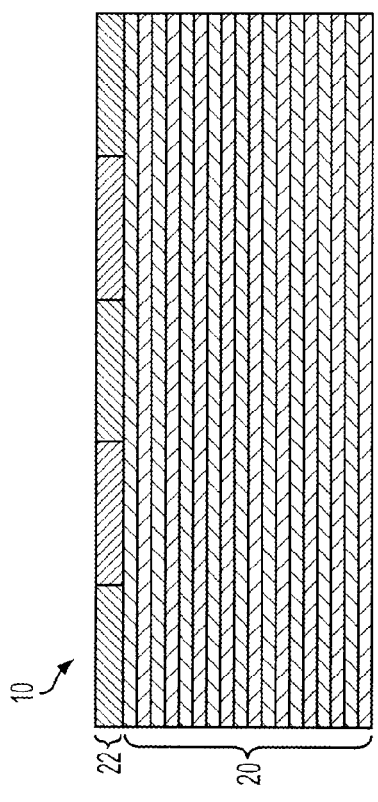
FIG. 1 depicts a multiplexed uplink broadcast transmission in accordance with an exemplary embodiment of the present invention.

With reference to FIG. 1, an exemplary multiplexed uplink for broadcast service transmission 10 is shown. It is to be understood that the broadcast service stream can be transmitted wirelessly or via a wired network. For example, the broadcast service stream can comprise a few hundred different channels of programming content provided via a selected digital broadcast service wherein one or more of the channels have indices for facilitating content insertion to permit users to subscribe to either a standard service having a selected amount or no commercial content or a less expensive service having more commercial content selectively inserted into certain channels using the indices. The transmitted broadcast stream 10 preferably comprises a plurality of program channels indicated generally at 20, and one or more auxiliary channels 22. The program channels 20 and auxiliary channel(s) 22 are preferably multiplexed using, for example, time division multiplexing. It is to be understood, however, that the present invention can be used with a single broadcast stream having one channel (e.g., an FM radio broadcast channel).

In the exemplary embodiment illustrated in FIG. 1, an auxiliary channel 22 preferably provides indexed content to receivers that can be selectively cached at the receiver. These cached segments (e.g., commercial segments) are provided to receivers for later substitution into a received broadcast stream being played back to a user. The selection of which cached segment to insert into the buffered stream at a given point during play back can be performed automatically (i.e., using programmed logic at the receiver) and depend on one or more factors such as geographic location of the receiver, user profile (e.g., as identified when the receiver is activation), time and/or date, expiration date of the commercial segment, among other factors. The content segments provided to receivers via the auxiliary channel 22 are preferably uniquely identifiable. The cached content segments can also be received via a delivery method other than the broadcast method of the broadcast service, such as through a physical programming interface, a Wi-Fi or Bluetooth link or delivered via a portable memory device. The auxiliary channel can also provide selected music segments for caching at receivers, as described in U.S. Pat. No. 7,180,917, that are uniquely identifiable and playlists to provide receivers with lists of selected music segments for retrieval and playback. The playlisted songs can be played back at the receiver by being injected as a block of music segments into a selected buffered channel, or lieu of receiving live content (e.g., operating the receiver in a My Music mode of playing back cached content in lieu of a Live Mode in which the receiver plays back currently received broadcast data).

Figure 2:
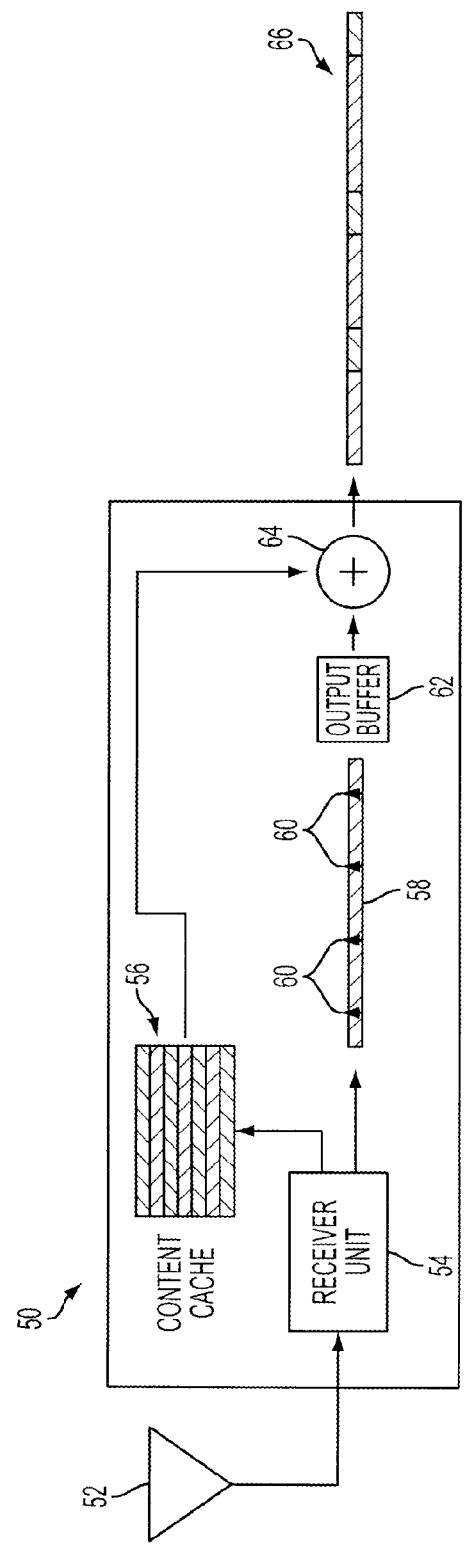
FIG. 2 is a block diagram of a receiver in accordance with an exemplary embodiment of the present invention.

With reference to FIG. 2, an exemplary receiver 50 is provided which is configured to perform content injection in accordance with an exemplary embodiment of the present invention. The receiver 50 comprises an antenna 52 or other interface to receive a broadcast stream (e.g., an SDARS stream) via a wireless or wired network. In the exemplary embodiment illustrated in FIG. 2, the receiver 50 receives an SDARS stream from a satellite via antenna 52 that is demodulated, decoded and demultiplexed via the receiver unit 54. Again, a single broadcast stream can be used such as an FM broadcast. Commercial or other content (e.g., music segments and playlists, or program segments such as market-directed program segments or segments containing channel sponsor material) received from the auxiliary stream 22 can be stored in the content cache 56 in accordance with programmed logic provided to a processor (not shown) in the receiver unit 54. A content stream representing a single channel 58 demultiplexed from the received multiplexed broadcast stream is provided to a buffer(s) 62 in FIG. 2. It is to be understood, however, that the receiver 50 is preferably configured to demultiplex and store a plurality of program channels from the received broadcast stream into the buffer 62. As described in further detail below in connection with FIGS. 3-5, selected content from the content cache 56 is inserted into a program channel stream 58 as indicated at 64 in FIG. 2 to create a playback stream 66 having locally cached commercial segments or other segments inserted therein. For example, the playback stream 66 can be a Top Tracks program channel received from the broadcast stream having between 3 and 5 songs dropped therefrom per hour in lieu of inserted locally cached content. In addition, buffer management is performed to prevent an infinitely growing buffer 62. For example, the output buffer 62 can limit received stream playback delay resulting from cached content insertion by dropping complete songs as needed, depending on the amount of content that gets inserted into the playback stream in a given time period.

In accordance with an exemplary embodiment of the present invention, the broadcast stream can be SDARS offered at a standard subscription rate with a selected amount of or no commercial content in one or more of its programming channels. Content insertion in accordance with the present invention can be performed to increase the commercial content in one or more of the SDARS channels to permit offering the SDARS at a lower rate than the standard subscription rate.

With continued reference to FIG. 2, the demultiplexed stream 58 comprises a number of content index pointers (CPIs) 60. The CPIs correspond to changes or breaks between content segments in a broadcast stream. These changes or breaks can be represented for example, by a point in time in the received stream or a particular point in a packetized stream. The CPIs can correspond to changes in program segments in the received broadcast stream in general (e.g., a demodulated and decoded stream) or packet-by-packet changes in an intermediately processed packetized stream (e.g., a transport layer stream or service layer stream). The receivers are programmed to monitor the received broadcast stream to locate these changes. In accordance with an exemplary embodiment of the present invention, the CPIs 60 can correspond to changes in the Program Associated Data (PAD) that is provided to every track or segment transmitted via the broadcast stream. In particular, the broadcast program channels 20 can comprise segments or tracks, each of which has Program Associated Data (PAD) indicating artist name, song title, a program ID, a master frame start and end indicator and a content category (e.g., music genre). For example, SDARS transmits a preferably unique 32-bit Program ID for each track transmitted over the air or other broadcast transmission path. A new Program ID (PID) is preferably provided with each significant artist/title change. SDARS recording sessions at a receiver can therefore be divided into separate or individual tracks according to changes in PID/PAD data detected by the processor in the receiver unit. Thus, to indicate a CPI, the receiver can be given instructions via the broadcast stream or other source to insert a selected cached commercial segment into the received stream at 15 minutes past every hour. A programmable processor in the receiver 50, in turn, detects a PAD change at that designated time or the first PAD change thereafter, pauses the playback of the received stream from the buffer 62, and inserts the selected commercial track to create the output stream 66. The cached content can include an index, data indicating its length or duration, a label or other identifier, and the content itself (i.e., which can be audio, image or video) with its corresponding PAD. When playback of the commercial track is complete, playback of the received stream resumes but now with a time delay equal to the duration of the inserted commercial track.

In accordance with other exemplary embodiments of the present invention, the selective substitution of locally cached content exemplified herein can be used to customize the received broadcast stream for different market segments such as program channels sponsored by different corporate, government, municipal or private entities such as SDARS automotive partners, different industry groups, and entities providing services to foreign language-speaking listeners. The control data can identify different receivers or user groups (e.g., using different radio identifiers or user data defined when a receiver is activated) that are to receive and insert selected indexed content stream when they tune to a particular sponsored program channel. For example, an SDARS automotive partner can sponsor an SDARS program channel whereby the control data directs the receivers installed in selected automobiles to insert and play commercials and other cached program content selected by the sponsor into the sponsored channel whenever the receivers are tuned to that channel. Similarly, an industry such as a healthcare management group can sponsor channel that inserts wellness-related commercials and health-related programs into a sponsored channel. A corporate or public service entity can provide multiple language services to receivers by directing receivers having selected radio identifiers to insert content segments in a specified language into a selected received program channel. Since the control data can be selectively targeted to different receivers, the same broadcast program channel can be simultaneously sponsored by two or more different entities. As stated above, the indexed content segments can be transmitted as part of the broadcast stream or sent via a different transport link.

As will now be described in further detail with reference to FIGS. 3-5, the receiver outputs a delayed stream 66 from the buffer 62 into which locally cached content has been substituted at selected points in the received broadcast stream 58. Selected segments in the buffered broadcast stream are dropped from playback in view of the inserted locally cached content to ensure that the buffer and corresponding playback stream delay does not grow without management.

Figure 3:
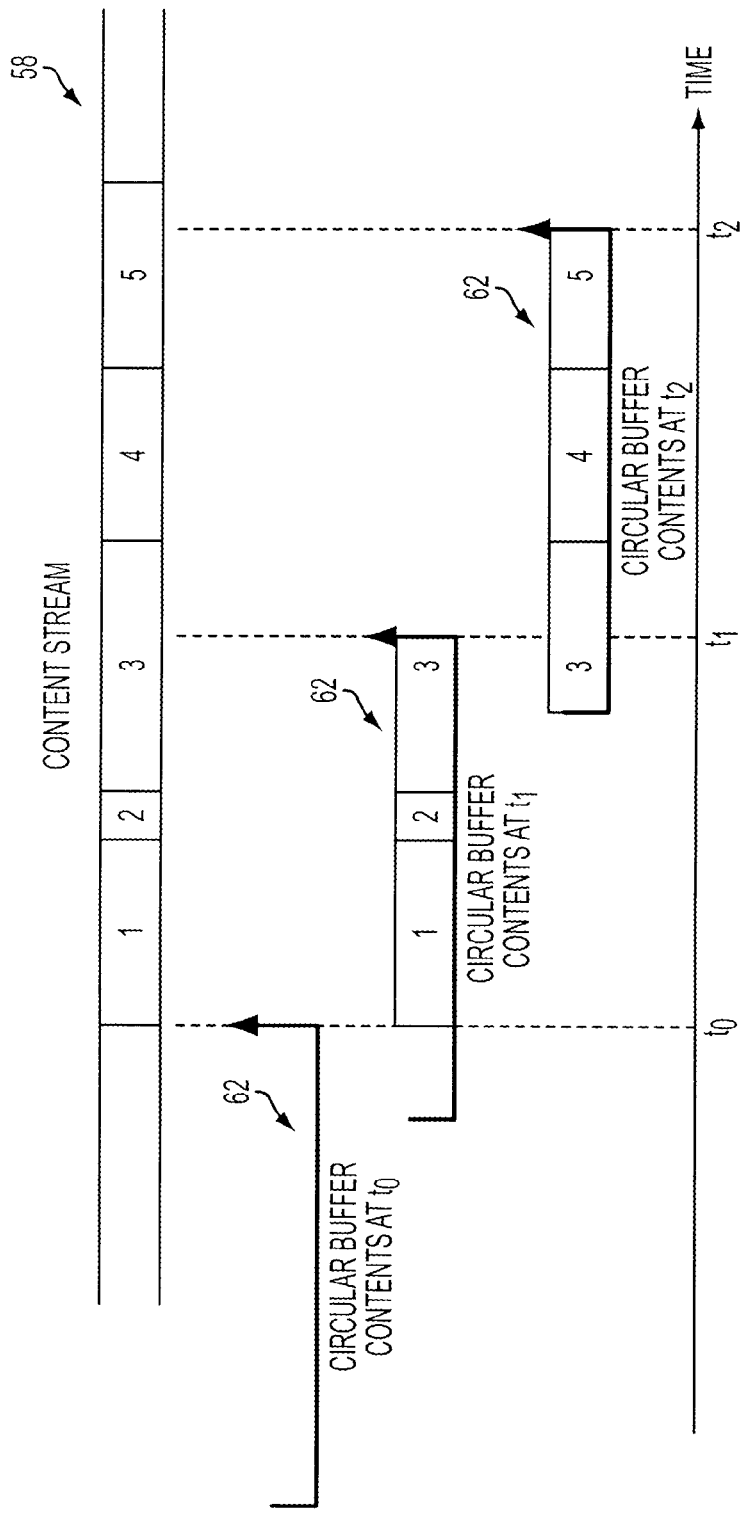
FIGS. 3, 4 and 5 illustrate buffering of received broadcast content, insertion of locally cached commercial content and management of the buffer in accordance with an exemplary embodiment of the present invention.

Reference is first made to FIG. 3 showing an illustrative received content stream 58 having segments 1, 2, 3, 4 and 5, and buffer 62 contents over a period of time (e.g., at intervals of times $t_0$, $t_1$ and $t_2$). In the exemplary embodiment, the buffer 62 is preferably a circular buffer. At time to, the buffer 62 is empty. At time $t_1$, segments or tracks 1, 2 and a portion of 3 have been received and buffered. At time $t_2$, segments 1 and 2 in the buffer have been written over by the remainder of segment 3 and subsequent segments 4 and 5.

Figure 4:
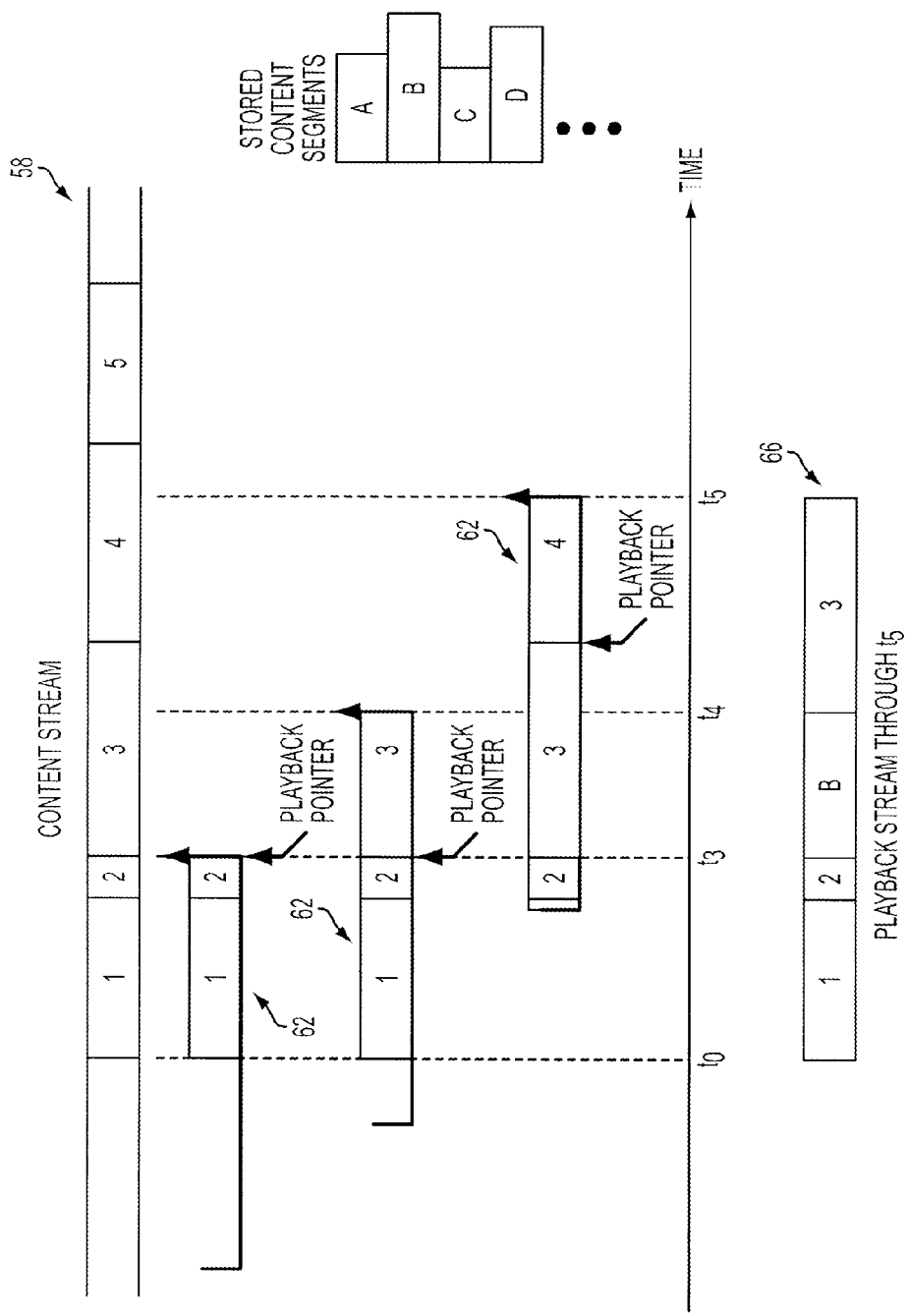

In FIG. 4, exemplary cached content segments (e.g., commercial segments) are shown as content segments A, B, C and D. A received content stream having segments 1, 2, 3, 4 and 5, and buffer 62 contents over a period of time (e.g., at intervals of times $t_3$, $t_4$ and $t_5$) are also shown. In accordance with an exemplary embodiment of the present invention, the broadcast waveform can include one or more bits to indicate whether a particular track can be immediately followed by a commercial segment insertion point. For example, track 1 can be formatted to not allow being followed by a commercial in the playback stream 66. Further, the receiver 50 can be controlled to detect or not detect the next CPI, in which case segment 1 can again be prevented from being followed by a commercial segment. When instructions to insert a content segment B are received such as via a broadcast schedule or via a content block in a particular channel of the received broadcast stream, the receiver 50 is programmed to insert content segment B after the next possible received segment, as indicated by the playback pointer after program segment 2. As shown in the playback stream 66, a content segment B commences playback at $t_3$, and the playback of the buffered segment 3 is delayed until after the content segment B has been played back. After content segment B is inserted and until the next receive content stream insertion or deletion, all content in the playback stream is played from within the buffer 62 and is delayed from the received content stream 58.

Figure 5:
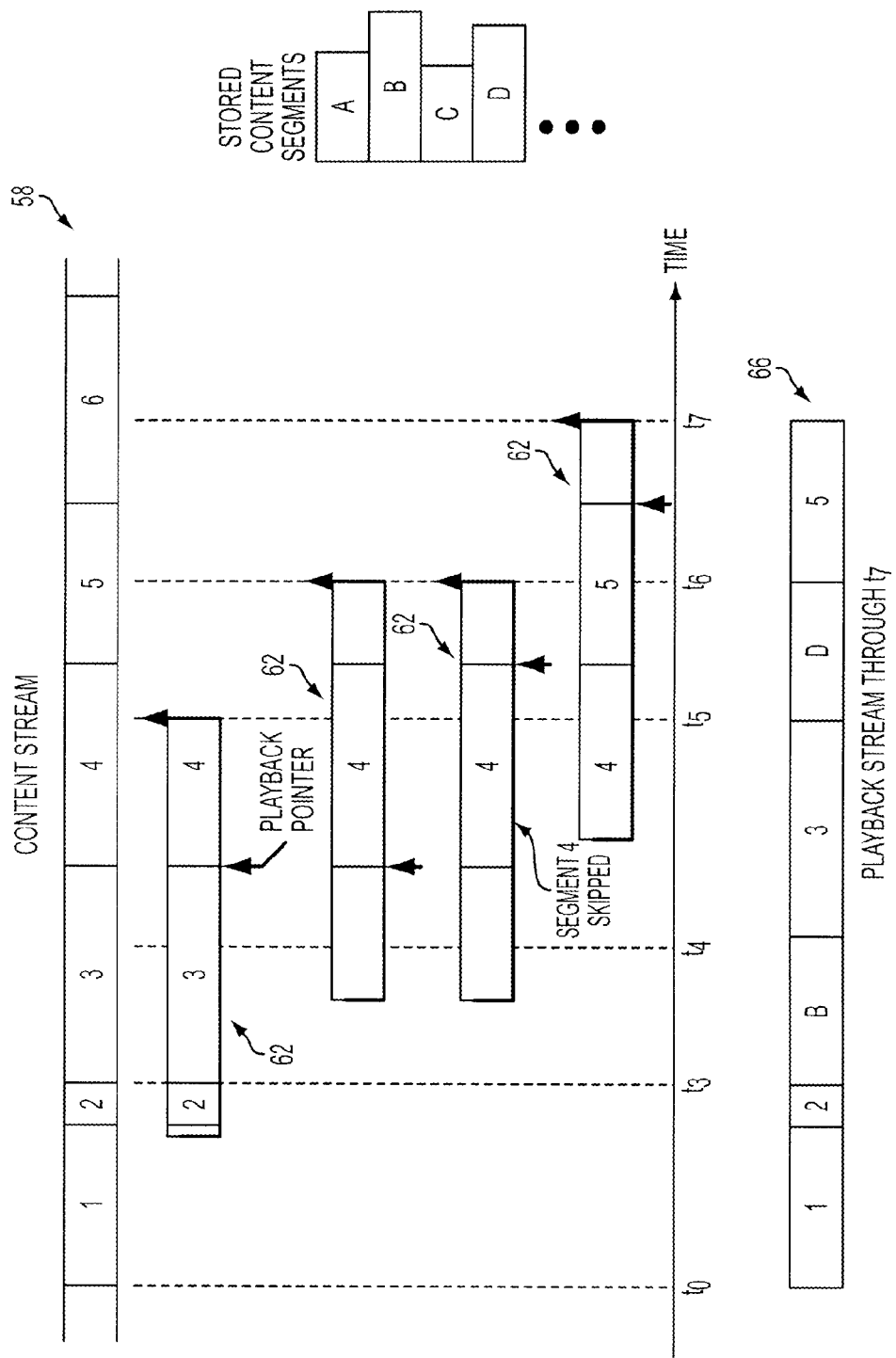

FIG. 5 illustrates when a segment (e.g., segment 4) is dropped from the buffer 62 in accordance with an advantageous operation of the receiver 50 that overcomes the potential problem of an infinitely growing buffer. As indicated in FIG. 5, the receiver 50 is programmed to jump to the next playback pointer and skip segments as needed. For example, the receiver 50 can be programmed to insert commercial segments B and D within a selected period (e.g., during lunch hour). After the delayed playback of segment 3 from the buffer between times $t_4$ and $t_5$, the receiver 50 inserts the next commercial segment D, as shown at time $t_5$. After the insertion of commercial segment D at time $t_6$, since a complete segment 4 has elapsed at this time, the receiver 50 drops segment 4 from the playback stream 66 and resumes delayed playback of segment 5 at time $t_6$. In order for the receiver to drop or skip one or more content segments, the content segment is preferably fully contained within the buffer. This insures the playback stream is resumed at the beginning of a new content segment and avoids playback of fragmented content segments. As stated above, the duration of a segment can be determined from the PAD which facilitates the determination of whether to drop a segment from the playback stream 66. Control bits in the PAD instruct the receiver whether or not the respective content segment may be removed from the stream.

The instructions to insert locally cached commercial content into a received broadcast stream that are provided to a receiver (i.e., via the broadcast stream or other source) are based on the subscription service paid for by the user of that receiver. For example, the receiver of a subscriber who that pays the premium subscription fee is not configured to insert commercial content into a received stream, but rather only receives whatever commercial content that is provided on the broadcast channels. Users, however, can opt to pay lower subscription rates for corresponding tiers of service in accordance with the present invention, For example, two different subscription rates (e.g., rate A at $6.00/month and rate B at $3.00 per month) that are lower than the premium subscription rate can be offered. Receivers of users paying rate A will be configured to insert 10 minutes of commercial content per hour into a received broadcast stream during playback, while receivers of users paying rate B will be configured to insert 20 minutes of commercial content per hour into a received broadcast stream during playback.

Figure 6:
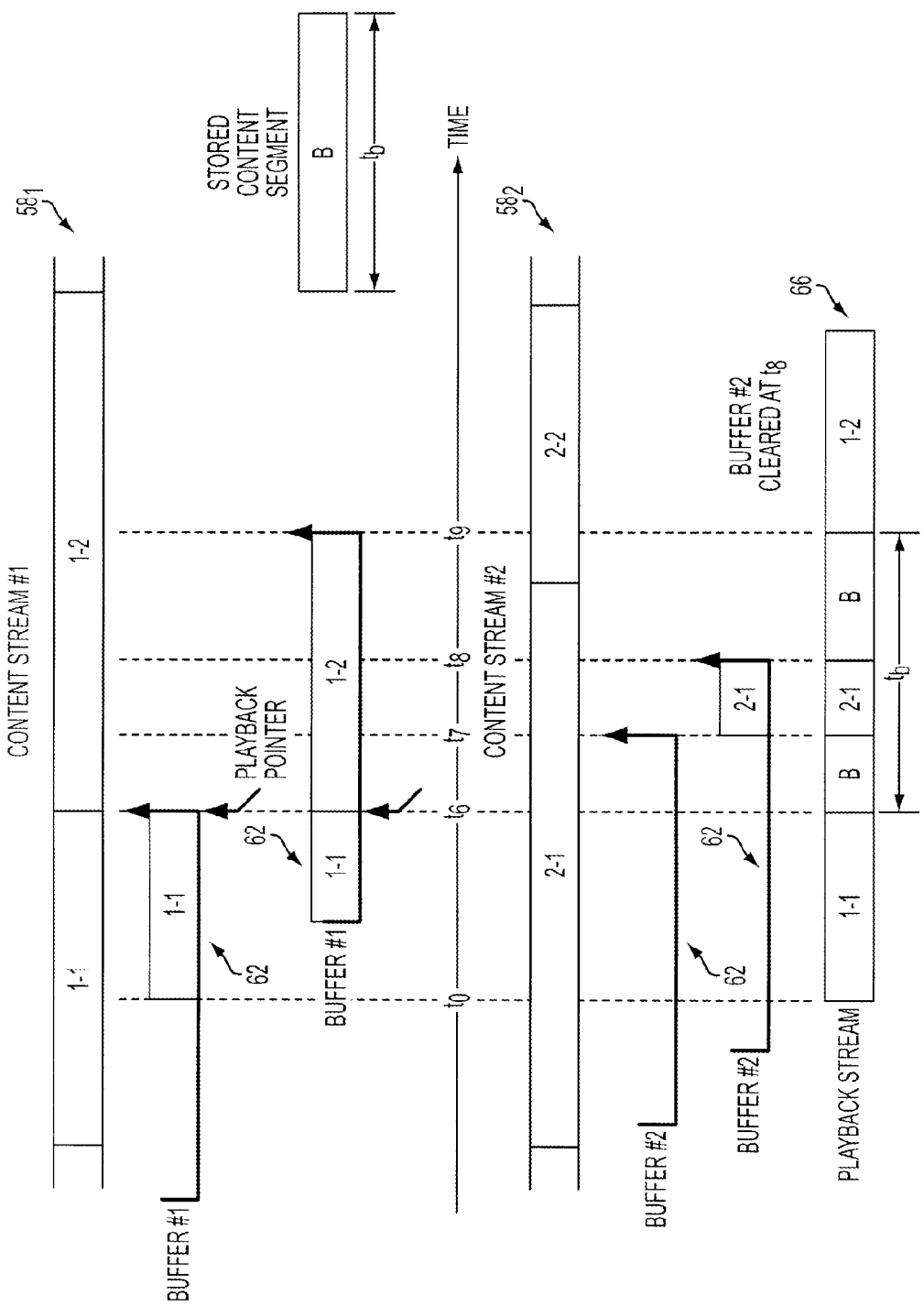
FIGS. 6, 7 and 8 illustrate buffering management during program channel changes in accordance with an exemplary embodiment of the present invention.
Figure 7:
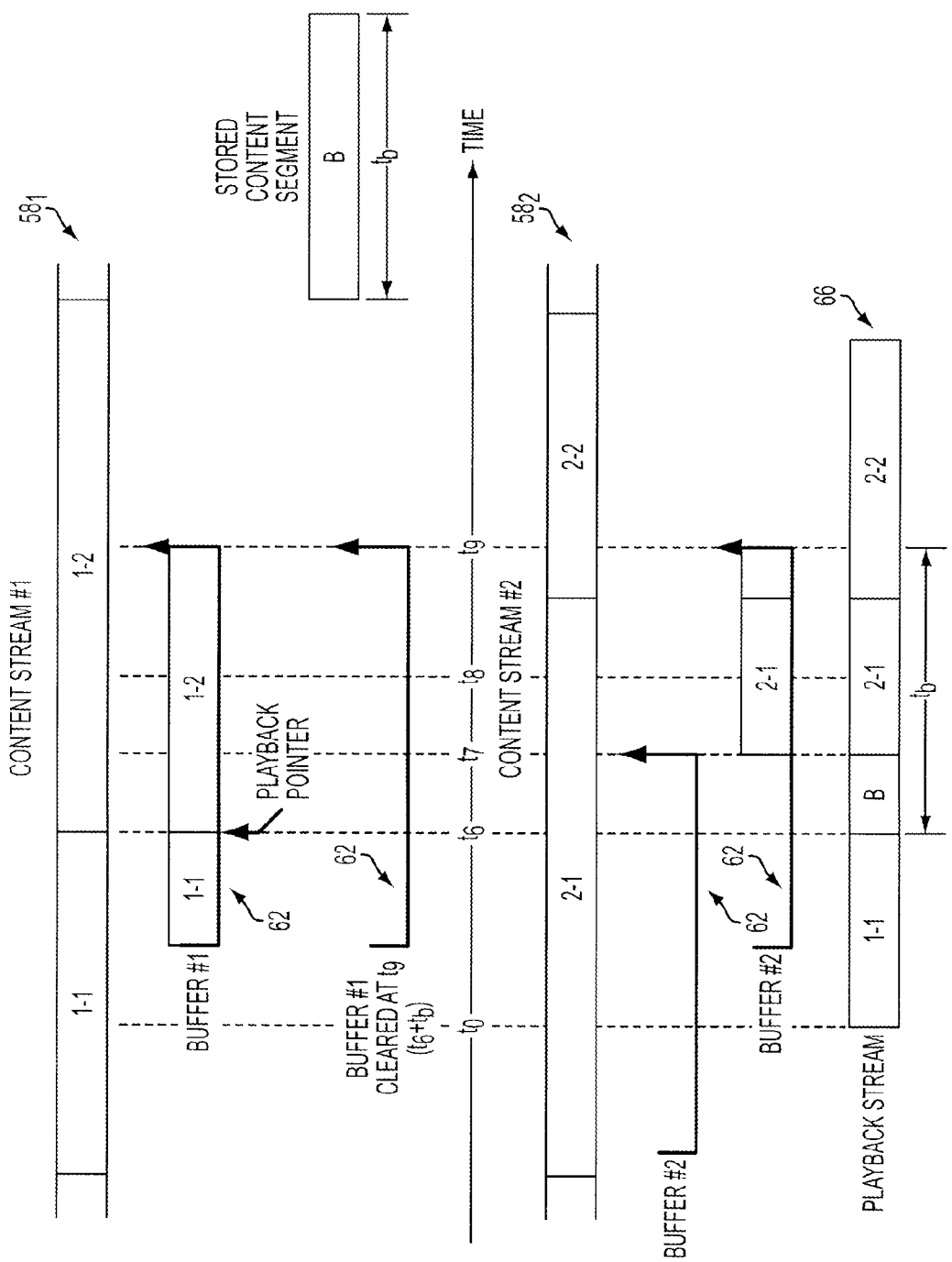
Figure 8:
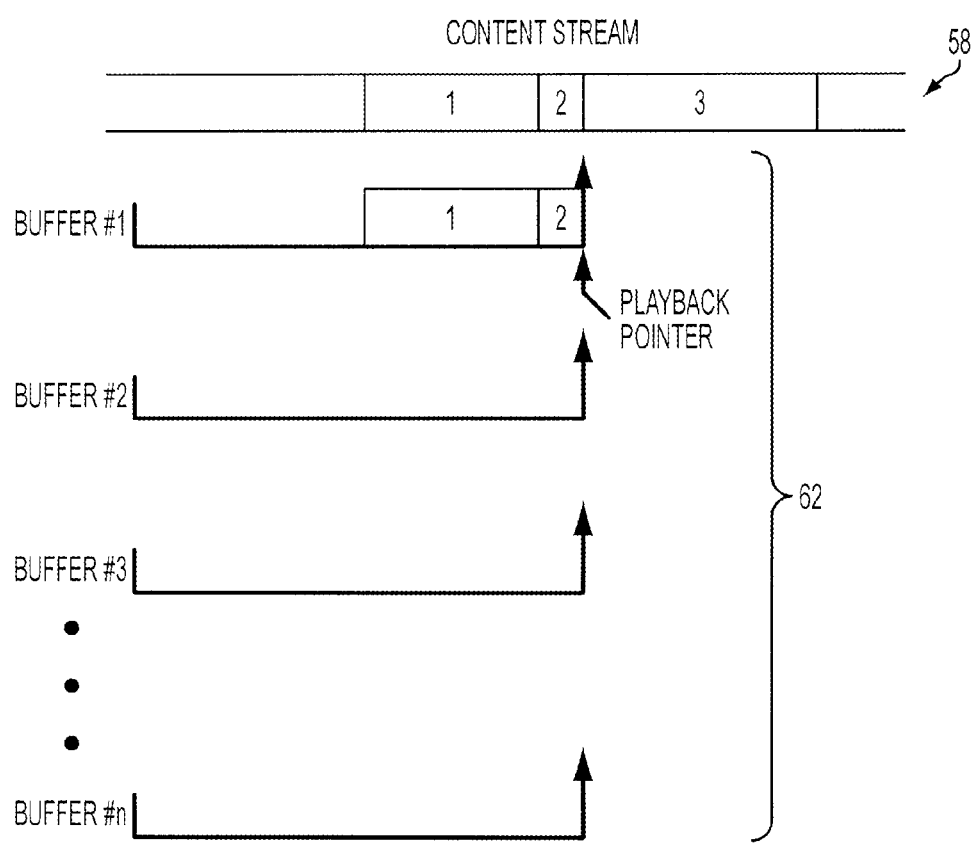

FIGS. 6, 7 and 8 will now be described with reference to another aspect of an exemplary embodiment of the present invention whereby content is inserted into a playback stream while channel changes are occurring at the receiver 50. In FIG. 6, content segment insertion and buffering is illustrated for a receiver that is tuned at time $t_7$ from channel 1 to channel 2, and tuned at $t_8$ back to channel 1. For contrast, FIG. 7 illustrates content segment insertion and buffering in a receiver that is tuned at time $t_7$ from channel 1 to channel 2, but is not tuned back to channel 1.

With continued reference to FIGS. 6 and 7, channel 1 is represented as content stream #1, and channel 2 is represented as content stream #2. The contents of plural buffers (e.g., buffer #1 and buffer #2) are illustrated at different points in time (i.e., $t_0$ and $t_6$ through $t_9$). The receiver 50 preferably maintains dynamic buffers $62a, \ldots, 62_n$ for storing content of the channel being played back and one or more other buffers for respective channels recently selected for playback. The buffers are preferably cleared when content from another channel is being played back in the playback stream and can be used to begin recording from the most recent or a different channel at later point in time. In FIGS. 6 and 7, commercial segment B is inserted for illustrative purposes, and the progress of a playback pointer is illustrated using an arrow as shown. A playback stream 66 is provided at the bottom of both FIGS. 6 and 7 to illustrate which content (e.g., segments from content stream #1, segments from content stream #2 or commercial segment B) is being played back at different times (e.g., $t_0$ and $t_6$ through $t_9$).

As shown in FIG. 6, a receiver is initially tuned to content stream #1. Buffer #1 commences recording content stream #1 at $t_0$ for essentially live playback, that is, the playback steam commences playback of the content segment 1-1 currently being received via content stream #1. For illustrative purposes, the receiver is scheduled to insert a commercial segment B at $t_6$. In other words, the receiver determines that it has been instructed to insert the segment, and that segment 1-1 is indicated via broadcast data or another source of information as not being restricted from having commercial content inserted thereafter. Accordingly, when the PAD data or other channel data source indicates a track change (e.g., from segment 1-1 to segment 1-2) at $t_6$, the receiver inserts commercial segment B into the playback stream at $t_6$ while the buffer #1 continues to buffer the currently tuned content stream #1.

At time $t_7$ in FIG. 6, a channel change is made to content stream #2. Buffer #2, which previously had been cleared, commences recording the content segment 2-1 currently being received on the selected content stream #2. In addition, the playback stream switches from playback of the content segment B to the content segment 2-1.

At time $t_8$ in FIG. 6, a channel change is made from content stream #2 back to content stream #1. Accordingly, the playback stream returns to playing back content segment B which is finished at $t_9$. In other words, $t_6$ plus the duration of the content block B, $t_b$, is equal to $t_9$. Meanwhile, the playback pointer for content stream #1 remains at the end of content segment 1-1, and buffer #1 has commenced recording 1-2. Thus, the playback stream commences playback of content segment 1-2 at $t_9$ when the insertion of commercial segment B into the playback stream is complete. Buffer #2 is cleared at $t_8$ when the receiver is tuned back to content stream #1. By maintaining Buffer #1, instead of clearing it, while the receiver is tuned to channel #2 insures subscribers will not be able to avert listening to a commercial by changing the channel and returning to the channel. When tuned to a channel, when the user changes the channel, the existing channel buffer is maintained only if stored content is actively being inserted or the playback content is delayed with respect to the live stream due to previously inserted content.

With reference now to FIG. 7, a receiver is initially tuned to content stream #1. Buffer #1 commences recording content stream #1 for essentially live playback, that is, the playback steam commences playback of the content segment 1-1 currently being received via content stream #1. For illustrative purposes, the receiver is scheduled to insert a commercial segment B at $t_6$. Accordingly, when the PAD data or other channel data source indicates a track change (e.g., from segment 1-1 to segment 1-2) at $t_6$, the receiver inserts commercial segment B into the playback stream at $t_6$ while the buffer #1 continues to buffer the currently tuned content stream #1.

At time $t_7$ in FIG. 6, a channel change is made to content stream #2. Buffer #2, which previously had been cleared, commences recording the content segment 2-1 currently being received on the selected content stream #2. In addition, the playback stream switches from playback of the content segment B to the content segment 2-1.

Unlike FIG. 6, no channel change occurs at time $t_8$. Accordingly, the playback stream continues playing back content stream #2 (segment 2-1 followed by segment 2-2, and so on until the next channel change or instruction to insert a content segment into received content stream #2. Meanwhile, buffer #1 is cleared at $t_9$ which is equal to $t_6$ plus $t_b$ since the duration of the inserted commercial segment to content stream #1 had already elapsed without a channel change back to content stream #1. As mentioned previously, buffer #1 would also have been maintained if the channel were changed after the playback of content segment B, since the playback stream would have been delayed at the time of the channel change. In this case, Buffer #1 would be maintained for a nominal period, such as 3 minutes, before being cleared. This is to insure if a user is listening to a song with a playback delay and briefly tunes to another channel and back, the playback content would continue with the same relative delay as opposed to abruptly changing the playback position by clearing the buffer and reverting to the live content stream.

FIG. 8 illustrates a selected number of buffers indicated generally at 62 that are dynamically maintained in accordance with an aspect of the present invention and the content stream.

FIGS. 9 and 10 illustrate, respectively, two different formats for control messages used to instruct a receiver as to when to insert content, that is, a generic scheduled insertion method and a generic stream ID insertion method. In FIG. 9, the control message instructs a receiver to perform generic scheduled insertion of segments (e.g., commercial segments) into a playback stream. For example, a receiver can be instructed to insert selected segments at least 4 times every hour. In FIG. 10, the control message instructs a receiver to perform generic stream ID insertion of segments (e.g., commercial segments) into a playback stream. For example, a receiver can be instructed to insert selected segments at selected points within a stream using a synchronous or asynchronous method. For a synchronous method, a bit is set to indicate a stream location specified using a Master Frame Count, for example. For an asynchronous method, a change in PAD can be used in the control message to specify a location in the stream for inserting the segment.

With continued reference to FIG. 9, nSID is a Number (n) of Service IDs (SID) in a message. SID1/T is First SID of n SIDs active for this message and associated Tier (T). This control message is acted upon by receivers which extract content from this SID (e.g. tune to the channel). If receiver Tier exceeds SID/T level, then this SID is not acted upon by the receiver. nMFC is a Number (n) of Master Frame Counts (MFC) or set times in a message. The MFC is an x-bit field in the header of each 432 mS SDARS TDM frame which is set to 0 at 12 AM and incremented every frame thereafter. This value can be used to derive the time of day. MFCW is a Window (W) of Master Frame Counts (or Time) for which the MFC is acted upon when tuning to the applicable SID. MFC1/T is a First MFC of n MFCs to set the trigger for content insertion along with the Tier. When the over-the-air MFC reaches the value of the MFC in this message, the receiver pauses the live stream at the next available content segment change and inserts the specified stored content IDs. If the receiver Tier exceeds the MFC/T level, then this MFC is not acted upon by the receiver. nS-CID is a Number (n) of Stored Content IDs (S-CID) contained in this message. This enables multiple CIDs to be inserted into the stream at the available content segment change after the specified MFC. S-CID1/T is a First S-CID of n S-CIDs to play from memory along with the Tier. If the receiver Tier exceeds the S-CID/T level, then this S-CID is not played by the receiver. The CID field preferably points to a specific content block stored in memory. Optionally, the CID field or ranges of values in the field could invoke a function which includes radio specific parameters, such as location, time of day, subscriber group, vehicle model, and so on, in order to identify the content block or blocks in memory appropriate for stream injection.

With continued reference to FIG. 10, nSID is a Number (n) of Service IDs (SID) in message. SID1/T is a First SID of n SIDs active for this message and associated Tier (T). This control message is acted upon by receivers which extract content from this SID (e.g. tune to the channel). If receiver Tier exceeds SID/T level, then this SID is not acted upon by the receiver. SMFC is a Start of Master Frame Count range for which this message is applicable. The MFC is an x-bit field in the header of each 432 mS SDARS TDM frame which is set to 0 at 12 AM and incremented every frame thereafter. This value can be used to derive the time of day. EMFC is an End of MFC range for which this message is applicable. nB-CID is a Number (n) of Broadcast Content IDs contained in this message. A B-CID is assigned to each content segment broadcast in the live stream. B-CID1/T is a First B-CID of n B-CIDs to set the trigger for content insertion along with the Tier. When the over-the-air B-CID on the SID designated in this message matches the B-CID in this message, the receiver pauses the live stream at the end of the B-CID content segment and inserts the specified Stored Content IDs (S-CIDs). If the receiver Tier exceeds the B-CID/T level, then this B-CID is not acted upon by the receiver. nS-CID is a Number (n) of Stored Content IDs (S-CID) contained in this message. This enables multiple CIDs to be inserted into the stream at the available content segment change after the specified MFC. S-CID1/T is a First S-CID of n S-CIDs to play from memory along with the respective Tier. If the receiver Tier exceeds the S-CID/T level, then this S-CID is not played by the receiver.

It is to be understood that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to a certain embodiment thereof, it will be understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A method of inserting content into a received broadcast stream for playback comprising:
receiving a broadcast stream comprising at least one program channel for playback and processing the received broadcast stream for playback at a user's receiver in a playback stream;
determining changes between program channel content segments in the program channel;
receiving indexed content segments that can be inserted into the playback stream at selected content index pointers corresponding to potential insertion points between selected ones of the program channel content segments;
receiving control data indicating which of the indexed content segments to store at the receiver and insert into the playback stream;
storing selected ones of the received indexed content segments at the receiver in accordance with the received control data;
generating the playback stream using the program channel;
determining which of the stored indexed content segments are to be inserted into the playback stream;
buffering the program channel, pausing the buffered program channel at a selected one of the content index pointers during playback of the playback stream, and inserting a selected one of the stored indexed content segments into the playback stream in accordance with the control data; and
resuming playback of the buffered program channel by determining at the receiver which of the buffered program content segments to playback when resuming the playback of the buffered program channel, the buffered program channel being time delayed relative to the received broadcast stream during playback due to the inserted indexed content segment.

2. A method as claimed in claim 1, the resuming further comprising determining at the receiver which of the buffered program content segments to skip in the buffer to limit playback stream delay of the buffered program content segment.

3. A method as claimed in claim 1, further comprising skipping a program channel part constituting an entire buffered content segment from the buffered program channel to avoid the resuming of playback using a fragmented buffered content segment.

4. A method as claimed in claim 1, wherein the content index pointers are data provided in the broadcast stream, and further comprising receiving at least one of the content index pointers and other auxiliary data at the receiver which indicates that a selected program channel segment in the received broadcast stream cannot be followed by an inserted indexed content segment during playback, the auxiliary data being provided via at least one of the broadcast stream and another transport channel.

5. A method as claimed in claim 1, further comprising receiving at least one of the content index pointers and other auxiliary data at the receiver which indicates that a program channel segment in the received broadcast stream cannot be dropped from playback.

6. A method as claimed in claim 1, wherein the indexed content segments are commercials, and further comprising:

receiving the control data which indicates a selected amount of the commercials for insertion into the playback stream depending on different tiers of subscription service; and operating the receiver to insert the selected amount of commercials into the playback stream that corresponding to a selected one of the tiers of subscription service indicated in the received control data.

7. A method as claimed in claim 1, further comprising:

maintaining plural buffers for storing respective ones of the at least one program channel currently selected for the playback stream and at least one other program channel recently selected for playback;

clearing one of the plural buffers when content from another one of the plural buffers is being currently selected for playback in the playback stream; and commencing recording content from another program channel in the cleared buffer;

wherein the clearing of content from the plural buffers is delayed a selected amount of time corresponding to at least the duration of the selected indexed content segment currently being inserted into the playback stream to prevent avoiding playback of commercials through rapid program channel changes and to allow reverting to a previously selected program channel for playback that is subject to a delay that corresponds to the duration of the program channel change.

8. A method as claimed in claim 1, wherein the indexed content segments are songs, and further comprising:

receiving the control data which indicates a playlist of selected songs; and operating the receiver to insert the songs indicated by the playlist in the received control data into the playback stream.

9. A method as claimed in claim 1, wherein the broadcast stream is a satellite digital audio radio service (SDARS) content stream comprising program associated data (PAD), and further comprising using the PAD as the content index pointers, the PAD indicating changes between at least one of artist, song title and a program identifier provided for each program broadcast in the program channel.

10. A method as claimed in claim 1, further comprising operating the receiver in accordance with control data comprising factors indicating which of a plurality of receivers are to substitute selected ones of the indexed content segments into their respective playback streams, the factors comprising at least one of geographic location of the receiver, user profile, time of day, date, and expiration date of a corresponding indexed content segment.

11. A method as claimed in claim 1, wherein the at least one program channel is sponsored by an entity that selects the indexed content segments to be inserted using selected ones of a plurality of receivers to be targeted by the entity, and further comprising:

receiving the control data which indicates the indexed content segments selected by the entity and when to insert them into the sponsored program channel; and operating at least one of the receivers targeted by the entity in accordance with the control data to insert the indexed content segments selected by the entity into playback stream.

12. A method as claimed in claim 1, further comprising buffering at least part of the buffered program content segment currently being received, and continually refreshing the buffer with a selected duration of the buffered program channel as it is being received.

13. One or more non-transitory, processor-readable storage devices having processor-readable code embodied on the processor-readable storage devices for programming a processing device in a digital audio broadcast radio receiver to perform a method of generating a playback stream from a received broadcast program channel having selectively inserted content, the method comprising:

receiving a broadcast stream comprising at least one program channel for playback and processing the received broadcast stream for playback at a user's receiver in a playback stream;

determining changes between program channel content segments in the at least one program channel;

receiving indexed content segments that can be inserted into the playback stream at selected content index pointers corresponding to potential insertion points between selected ones of the program channel content segments;

receiving control data indicating which of the indexed content segments to store at the receiver, and at least one of the frequency and when to insert selected ones of the indexed content segments into the playback stream;

storing selected ones of the received indexed content segments at the receiver in accordance with the received control data;

generating the playback stream using the program channel;

determining which of the stored indexed content segments are to be inserted into the playback stream;

buffering the program channel, pausing the buffered program channel at a selected one of the content index pointers during playback of the playback stream, and inserting a selected one of the stored indexed content segments into the playback stream in accordance with the control data; and resuming playback of the buffered program channel by determining at the receiver which of the buffered program content segments to playback when resuming the playback of the buffered program channel, the buffered program channel being time delayed relative to the received broadcast stream during playback due to the inserted indexed content segment.

14. Processor-readable storage devices as claimed in claim 13, the resuming further comprising determining at the receiver which of the buffered program content segments to skip in the buffer to limit playback stream delay of the buffered program content segment.

15. Processor-readable storage devices as claimed in claim 13, further comprising skipping a program channel part constituting an entire buffered content segment from the buffered program channel to avoid the resuming of playback using a fragmented buffered content segment.

16. Processor-readable storage devices as claimed in claim 13, wherein the content index pointers are data provided in the broadcast stream, and the method further comprising receiving at least one of the content index pointers and other auxiliary data at the receiver which indicates that a selected program channel segment in the received broadcast stream cannot be followed by an inserted indexed content segment during playback, the auxiliary data being provided via at least one of the broadcast stream and another transport channel.

17. Processor-readable storage devices as claimed in claim 13, the method further comprising receiving at least one of the content index pointers and other auxiliary data at the receiver which indicates that a program channel segment in the received broadcast stream cannot be dropped from playback.

18. Processor-readable storage devices as claimed in claim 13, wherein the indexed content segments are commercials, and the method further comprising:

receiving the control data which indicates a selected amount of the commercials for insertion into the playback stream depending on different tiers of subscription service; and operating the receiver to insert the selected amount of commercials into the playback stream that corresponding to a selected one of the tiers of subscription service indicated in the received control data.

19. Processor-readable storage devices as claimed in claim 13, further comprising:

maintaining plural buffers for storing respective ones of the at least one program channel currently selected for the playback stream and at least one other program channel recently selected for playback;

clearing one of the plural buffers when content from another one of the plural buffers is being currently selected for playback in the playback stream; and commencing recording content from another program channel in the cleared buffer;

wherein the clearing of content from the plural buffers is delayed a selected amount of time corresponding to at least the duration of the selected indexed content segment currently being inserted into the playback stream to prevent avoiding playback of commercials through rapid program channel changes and to allow reverting to a previously selected program channel for playback that is subject to a delay that corresponds to the duration of the program channel change.

20. Processor-readable storage devices as claimed in claim 13, wherein the indexed content segments are songs, and the method further comprising:

receiving the control data which indicates a playlist of selected songs; and operating the receiver to insert the songs indicated by the playlist in the received control data into the playback stream.

21. Processor-readable storage devices as claimed in claim 13, wherein the broadcast stream is a satellite digital audio radio service (SDARS) content stream comprising program associated data (PAD), and the method further comprising using the PAD as the content index pointers, the PAD indicating changes between at least one of artist, song title and a program identifier provided for each program broadcast in the program channel.

22. Processor-readable storage devices as claimed in claim 13, the method further comprising operating the receiver in accordance with control data comprising factors indicating which of a plurality of receivers are to substitute selected ones of the indexed content segments into their respective playback streams, the factors comprising at least one of geographic location of the receiver, user profile, time of day, date, and expiration date of a corresponding indexed content segment.

23. Processor-readable storage devices as claimed in claim 13, wherein the at least one program channel is sponsored by an entity that selects the indexed content segments to be inserted using selected ones of a plurality of receivers to be targeted by the entity, and the method further comprising:

receiving the control data which indicates the indexed content segments selected by the entity and when to insert them into the sponsored program channel; and operating at least one of the receivers targeted by the entity in accordance with the control data to insert the indexed content segments selected by the entity into playback stream.

24. Processor-readable storage devices as claimed in claim 13, the method further comprising buffering at least part of the buffered program content segment currently being received, and continually refreshing the buffer with a selected duration of the buffered program channel as it is being received.

* * * * *